(No Model.)

J. RIST & A. F. CLUBINE.
IRRIGATING APPARATUS.

No. 417,339. Patented Dec. 17, 1889.

Witnesses:
Jessie E. Young
R. B. Seward

Inventors:
J. Rist
A. F. Clubine
By James E. Young and
E. C. Seward
their Attys.

N. PETERS, Photo-Lithographer, Washington, D. C.

UNITED STATES PATENT OFFICE.

JOSEPH RIST AND ANDREW F. CLUBINE, OF KANSAS CITY, MISSOURI.

IRRIGATING APPARATUS.

SPECIFICATION forming part of Letters Patent No. 417,339, dated December 17, 1889.

Application filed September 16, 1889. Serial No. 324,100. (No model.)

*To all whom it may concern:*

Be it known that we, JOSEPH RIST and ANDREW F. CLUBINE, citizens of the United States, residing at Kansas City, in the county of Jackson and State of Missouri, have invented certain new and useful Improvements in Irrigating Apparatus; and we do hereby declare the following to be a full, clear, and exact description of the invention, such as will enable others skilled in the art to which it appertains to make and use the same.

Our invention relates to irrigating apparatus.

The object is to provide a controlling-carriage for the purpose of moving the sprinkler-pipes over the field to distribute the water as desired.

A further object is to provide a controlling-carriage, in connection with suspended sprinkler-pipes, which may be conveniently operated from the ground, and which shall be simple and effective.

With these ends in view our invention consists in certain features of construction and combinations of parts, as will be hereinafter described, and pointed out in the claims.

Figure 1:
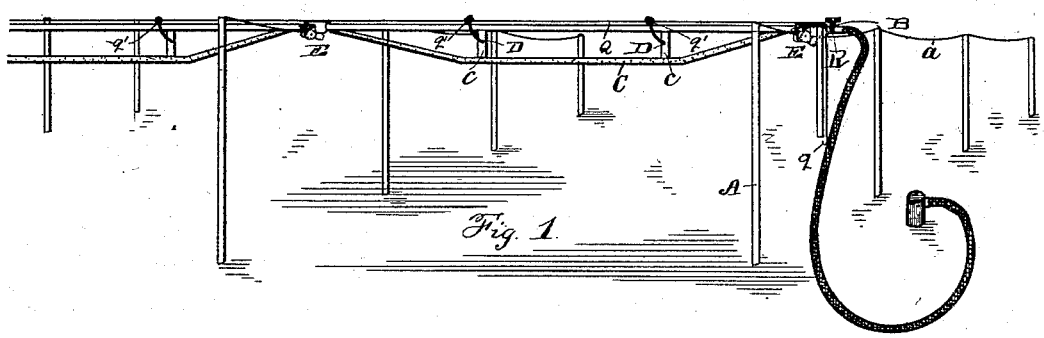
Figure 4:
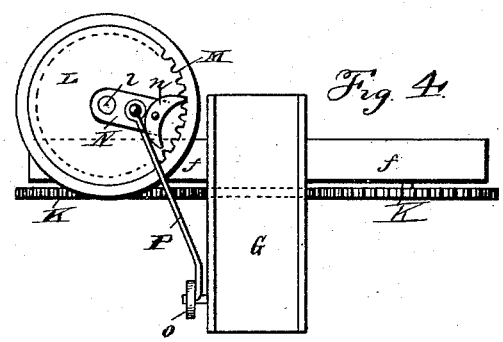
Figure 3:
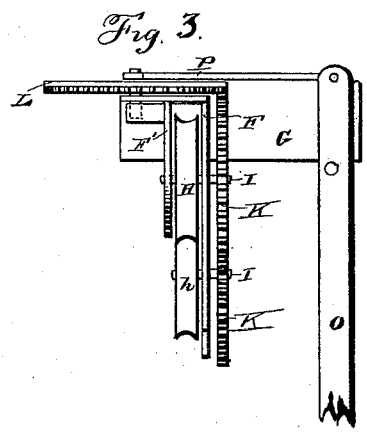
Figure 2:
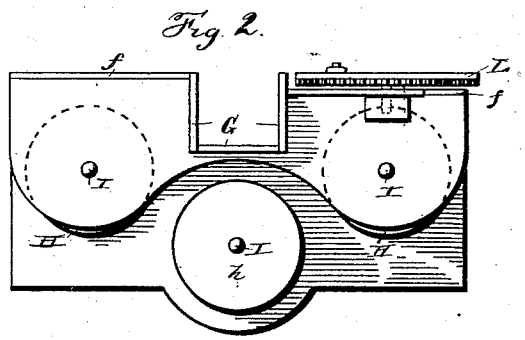

In the accompanying drawings, Figure 1 represents a portion of a system of suspended sprinkler-pipes with the controlling-carriage in position for use. Fig. 2 represents a view of the controlling-carriage in side elevation, showing the position of the cable-carrying sheaves. Fig. 3 represents an end view of the carriage, and Fig. 4 a plan view of the same.

A represents a set of supporting-posts located at suitable intervals across a field, and $a$ represents supporting-cables extending from post to post for the purpose of supporting the sprinkling apparatus. The latter consists of a supply-pipe B, connected by flexible hose with a general supply, and a sprinkler-pipe C, connected at suitable intervals with the supply-pipe by short pipes $c$, each of which is preferably provided with a faucet or stop-cock D. The supply and sprinkler pipes are supported at the points where they cross the supporting-cables $a$ upon carriage E, constructed to roll freely along the cable, and at the end of the irrigating-section the supporting-carriage is so constructed that it may be operated from the ground, so as to carry the supply and sprinkler pipes transversely of their length along the supporting-cables across the field or across one section of the field.

The construction of the controlling-carriage is as follows:

A frame-work consisting of two parallel side pieces F and F', the former of which is conveniently considered the front and the latter the back, is secured together by suitable girders $f$, and also by a trough-section G, adapted to receive the supply and sprinkler pipes. Between the side pieces F and F' a pair of sheaves H are loosely mounted, and in the same plane with the sheaves, and at a point between and slightly below said sheaves, a third sheave $h$ is loosely mounted. The sheaves H are adapted to rest on the cable, and the sheave $h$ is so located that its face will bear underneath the cable when the sheaves H are in position thereon. The several sheaves referred to are fixed to their axles, the latter having a free rotary movement in their bearings and projecting through the front F of the supporting-frame. The projecting ends of the axles I of the sheaves each have fixed thereon a gear-wheel K, the three gear-wheels being of the same size, provided with the same number of teeth, and arranged to intermesh.

A horizontal wheel L is loosely mounted on a stud $l$, and is provided with gear on the under edge of its periphery arranged to intermesh with the gear on the periphery of one of the wheels K. The wheel L is also provided on its upper face with annular interior gear M, and an arm N is loosely mounted on the stud-axle $l$ above the wheel L, and carries on its free end a double-acting dog $n$, adapted to engage the said interior gear M whichever way the arm N be swung.

An operating-lever O is pivoted to the carriage, as shown, its free end or handle projecting downwardly within reach of an operator standing on the ground, and its opposite end connected with the arm N by a rod or pitman P.

The operation is as follows: When the water is turned on to the sprinklers and it is desired to move the same along the cables across the field, the operator moves the lever O in the proper direction to turn the wheel L, so that it, through its connection with the wheel K, will cause the sheave H to travel along the cable in the desired direction. The rotary movement of the sheave H will be communicated through the other wheels K, first to the sheave beneath the cable, which will be turned in the opposite direction from the sheave H above, and hence will force the carriage in the same direction, and, secondly, to the other sheave H above the cable, which will be turned in the same direction as the first sheave H, and hence the three sheaves will simultaneously force the carriage with the sprinkler-pipes thereon along the cable across the field. The several stop-cocks in the branch pipes leading to the sprinkler are under the control of the operator by means of cords or wires Q, leading from their operating-handles q along the supply-pipe to the controlling-carriage, and thence downwardly to within reach of the operator, as shown. Said stop-cocks may be conveniently made self-closing by weighted handles q', if so desired; or the common expedient of springs for this purpose might be employed. A single controlling-valve R admits water to the movable supply-pipe.

It is evident that slight changes might be resorted to in the form and arrangement of the several parts described without departing from the spirit and scope of our invention; hence we do not wish to limit ourselves strictly to the construction set forth; but,

Having thus fully described our invention, what we claim as new, and desire to secure by Letters Patent, is—

1. In combination, a stationary support located above the surface of the ground, movable supports mounted on the stationary support, a supply-pipe and sprinkler-pipe carried by the movable supports, propelling-gear in connection with one of the movable supports, and controlling-cocks for the admission of water to the sprinkler, the propelling-gear and cocks having operating devices extending to within reach of the operator on the ground, substantially as set forth.

2. In combination, a cable-support, a carriage provided with sheaves mounted on said cable, the said carriage being provided with a seat for the reception of the sprinkler-pipes, intermeshing gear connecting the sheave-axle, driving-gear in engagement with one of the sheave-gears, a lever extending from the carriage to within reach of an operator, a dog in engagement with the driving-gear, and a rod connecting the lever and rod-support, whereby the carriage is propelled with its load along the cable, substantially as set forth.

3. In combination, a cable, a carriage provided with sheaves arranged to engage the upper and lower faces of the cable, gear secured to the sheaves and intermeshing, a driving gear-wheel provided with gear on its under side arranged to engage one of the sheave-gears, and with annular interior gear on its upper side, an arm free to swing on the axle of the driving gear-wheel, a double-acting dog pivoted to the arm in position to engage the interior gear, an operating-lever, and a rod connecting the operating-lever and dog-carrying arm, substantially as set forth.

In testimony whereof we have affixed our signatures in presence of two witnesses.

JOSEPH RIST.
ANDREW F. CLUBINE.

Witnesses:
BESSIE E. YOUNG,
JOSEPH U. STRODE.